Nov. 8, 1966   D. G. STERRY   3,284,766
SIMULTANEOUS VARIABLE DENSITY RECORDING SYSTEM
Filed Sept. 23, 1963
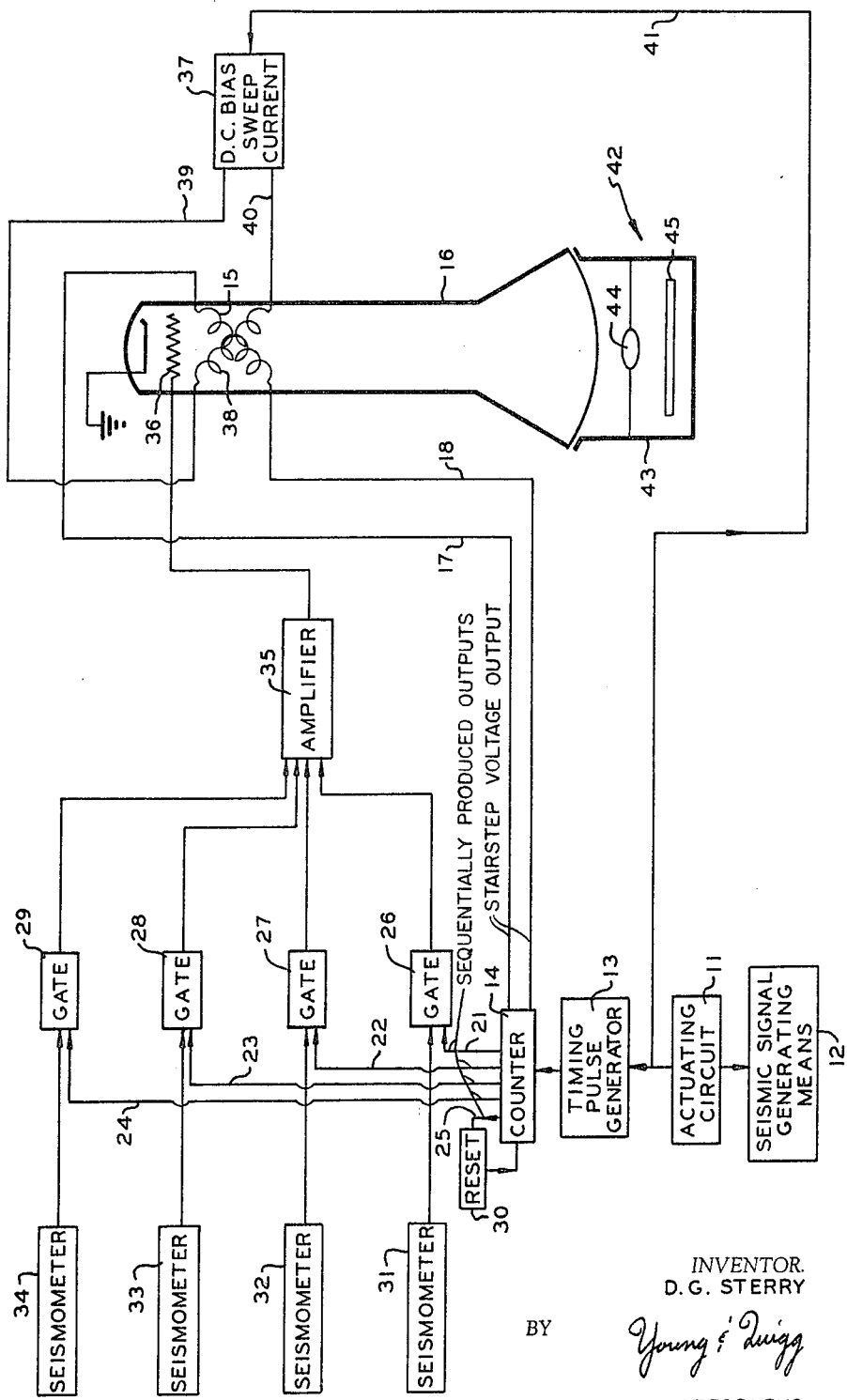
INVENTOR.
D. G. STERRY
BY Young & Quigg
ATTORNEYS United States Patent Office 3,284,766
Patented Nov. 8, 1966

3,284,766
SIMULTANEOUS VARIABLE DENSITY
RECORDING SYSTEM
Dan G. Sterry, Bartlesville, Okla., assignor to Phillips
Petroleum Company, a corporation of Delaware
Filed Sept. 23, 1963, Ser. No. 310,725
4 Claims. (Cl. 340—15.5)

This invention relates to method and apparatus for recording signals. In one aspect the invention relates to method and apparatus for producing a variable density recording of a plurality of signals. In another aspect the invention relates to an improved data presentation method and apparatus for seismic surveying.

In geophysical prospecting valuable information can often be obtained concerning subsurface formations by means of seismic surveys. A plurality of seismometers is positioned at or near the surface of the earth in a predetermined geometric array and an explosive charge is detonated at a region spaced therefrom. Vibrations emitted from the explosive charge travel downwardly into the earth and are reflected from subterranean formations back to the seismometers. The seismometers establish corresponding electrical signals which are amplified and recorded. The signals usually are recorded side by side on a common chart. The reflected vibrations generally appear as maximum and minimum amplitudes. In making surveys of this type it is common practice to detonate explosive charges in sequence along a common line. The relative positions of the reflections on the several records thus provide indications of the dip of generally horizontal reflecting surfaces.

In accordance with the present invention there is provided an improved system for presenting the data obtained by seismic surveys. This system comprises, generally, sequentially sampling the output signal from each of a plurality of seismometers at a frequency substantially higher than the frequency of the seismic signals, that is, at a frequency sufficiently high to provide several samples of the highest frequency in the seismic signal. The sampled values are applied to the Z input of an oscilloscope, that is, across a grid for controlling the intensity of the electron beam. A signal representative of the particular seismometer output signal being sampled as applied to the Y axis of the oscilloscope, that is, the vertical deflection input, to cause the visual presentations of the seismic signals on the oscilloscope screen to be vertically spaced apart from each other. The output of a conventional sweep circuit can be applied to the X input, or horizontal deflection input, of the oscilloscope to present the sampled values of a given seismic signal in a horizontal line with a spacing corresponding to the time of sampling. A camera can be utilized to record the visual presentation of the seismic signals.

Accordingly it is an object of the invention to provide an improved system for presenting seismic data. Another object of the invention is to provide a visual record of a plurality of signals. It is an object of the invention to provide an improved variable density method and apparatus. Another object of the invention is to provide simple and inexpensive means for producing a variable density record of a plurality of signals.

Other objects, aspects, and advantages of the invention will become apparent to those skilled in the art from a study of the disclosure, the drawing and the appended claims to the invention.

Referring now to the drawing there is shown a schematic representation of one embodiment of the invention. An actuating circuit 11 is utilized to actuate seismic signal generating means 12. The latter can be a charge of dynamite or means for applying impulses to the earth or medium under investigation, as is well known in the art. Circuit 11 is also utilized to actuate timing pulse generator 13. Generator 13 produces an output comprising a series of pulses uniformly spaced with respect to time. The output of generator 13 is applied to an input of counter 14. Counter 14 can be any suitable counting means known in the art, for example a binary counter or a decimal counter, having first and second outputs. The first output of counter 14 provides a staircase output signal with such signal being advanced one unit or step for each timing pulse received by counter 14 from generator 13. The staircase output signal from counter 14 is applied across the Y deflection coil 15 of oscilloscope 16 by means of leads 17 and 18. The second output of counter 14 provides a plurality of signals in sequence, each being representative of a particular number of timing pulses received by counter 14 from generator 13. For the embodiment shown in the drawing the second output of counter 14 comprises signals representative of the receipt of 1, 2, 3, 4 and 5 timing pulses which are applied to lines 21, 22, 23, 24 and 25, respectively. Lines 21, 22, 23 and 24 are applied to the control inputs of gates 26, 27, 28 and 29, respectively. Line 25 is applied to reset means 30, the output of which is applied to the reset input of counter 14. In one particular embodiment counter 14 comprises a decimal counter having a plurality of "and" circuits in the second output circuit. Each "and" circuit has two inputs, one being connected to a respective one of the units outputs and the second being connected to a respective one of the tens outputs. Thus the and circuit having a first input connected to the 1 of the units outputs and a second input connected to the 0 of the tens outputs produces an output signal only for the first pulse received after the counter is reset. Multivibrators or other suitable pulse shaping means can be connected to the output of each and circuit to provide the desired pulse shape for the control signal to the respective gate.

The seismic signals from generating means 12 are reflected from subterranean formations and the reflected signals are detected by seismometers 31, 32, 33 and 34 which are positioned at or near the surface of the earth in a predetermined geometric arrangement with respect to generating means 12. The outputs from seimometers 31, 32, 33 and 34 are applied to the signal inputs of gates 26, 27, 28 and 29, respectively. The outputs of gates 26, 27, 28 and 29 are applied to respective inputs of summing amplifier 35. The output of amplifier 35 is applied to the grid 36 of oscilloscope 16. The output of D.C. bias sweep current means 37 is applied across the X deflection coil 38 of oscilloscope 16 by means of leads 39 and 40. D.C. bias sweep current means 37 is actuated by an output signal from circuit 11 transmitted by way of line 41. A camera 42 is positioned in front of the screen of oscilloscope 16 and comprises a housing 43, a lens 44, and film 45.

In the operation of the system circuit 11 actuates seismic signal generating means 12 and timing pulse generator 12 simultaneously or the latter a short time before the generating means 12. Circuit 11 also actuates D.C. bias current means 37 to apply a suitable sweep function voltage across X deflection coil 38. Generator 13, upon actuation, commences to pass timing pulses to counter 14. Upon the receipt of the first pulse a first value of voltage is applied across Y deflection coil 15 corresponding to a first vertical position on the screen of oscilloscope 16. Simultaneously a signal is passed by way of line 21 to actuate gate 26 to pass the output of seismometer 31 to the input of amplifier 35. The amplified signal is applied to the grid 36 to vary the intensity of the electron beam and thus the brightness of the corresponding spot on the screen as a function of the output of seismometer 31. Upon the receipt of the second pulse by counter 14 from generator 13, the voltage applied across Y deflection coil 15 is increased to a second value corresponding to the vertical position of the second signal to be recorded. Simultaneously the signal on line 21 terminates and a signal is applied by way of line 22 to actuate gate 27 to transmit the output of seismometer 32 to amplifier 35. The amplified signal is applied to grid 36 to vary the brightness of the corresponding spot on the screen of oscilloscope 16. Upon the receipt of the third pulse by counter 14 from generator 13, the voltage applied across Y deflection coil 15 is increased to a third value corresponding to the vertical position of the third signal to be recorded. Gate 28 is actuated by the appearance of a signal on line 23 to pass the output of seismometer 33 to amplifier 35. Upon the receipt of the fourth timing pulse the voltage applied across deflection coil 15 is increased to a fourth value corresponding to the vertical position on the screen of oscilloscope 16 of the fourth signal to be recorded, and gate 29 is actuated to pass the output of seismometer 34 to amplifier 35. Upon the receipt of the fifth timing pulse, a signal is applied by way of line 25 to reset means 30 to reset counter 14. Upon the appearance of the sixth timing pulse the scanning sequence is initiated again. The length of a cycle for the X axis is controlled by D.C. bias sweep current means 37 to provide time sufficient to present the output of the seismometers for a given shot, that is for each actuation of generating means 12, or for any desired portion thereof. In general the length of a cycle for the X axis sweep is on the order of six seconds. Generator 13 produces timing pulses at a frequency sufficiently high that the highest frequency of interest in the seismic signals will be sampled several times during each cycle thereof. Film 45 is exposed to the screen of oscilloscope 16 and photographically records the seismic signals as a corresponding plurality of vertically spaced horizontal lines, each line comprising a series of segments, each segment having a density representative of the intensity of the electron beam and thus the amplitude of the corresponding segment of sampled seismic signal.

As noted above, the drawing is merely diagrammatic and is not intended to fully show all component parts of the equipment which one skilled in the art will routinely design for the operation. Indeed, the showing of an element or piece of equipment does not mean that all such or similar pieces of equipment which may or can be designed by one skilled in the art in possession of this disclosure cannot be utilized as substitution therefor, likewise, the omission of an element which one skilled in the art may include in an actual unit does not mean that such a piece of equipment is intended to be omitted simply because it does not appear in the drawing. While the invention has been described in terms of recording the output signals of four seismometers it is within the contemplation of the invention to utilize any desired number of seismometers or any desired number of other sources of signals which are to be recorded.

While the invention has been described with the stairstep output of counting means being applied to the Y deflecting coil 15 and the output of current means 37 being applied to the X deflection coil 38, it is readily apparent that the X and Y axis as well as the terms vertical and horizontal are utilized in a broad sense merely to provide a basis of reference. Thus the recorded signals could be vertical lines horizontally spaced from each other, or even at some angle other than 0 to 90 degrees with respect to the vertical.

Suffice to say, the drawing is for illustrative purposes, as is the description thereof.

Reasonable variation and modification are possible within the scope of the foregoing disclosure, the drawing and the appended claims to the invention.

I claim:

1. Apparatus for producing a visual variable density record of a plurality of seismic signals comprising means for generating seismic signals; a timing pulse generator; means for actuating said timing pulse generator and said means for generating; counting means having a first output comprising a stairstep voltage with the voltage level being advanced one unit for each pulse applied to the input of the counting means, and a second output comprising a plurality of sequentially produced output signals, each of said sequentially produced output signals being representative of a respective predetermined number of pulses applied to the input of the counting means; means responsive to a predetermined one of said sequentially produced output signals for resetting said counting means; a plurality of seismometers for detecting reflected seismic signals and producing output signals representative thereof; a plurality of gating means corresponding in number with said plurality of seismometers, each of said gating means having a signal input and a control input; means for applying the output signal from each of said plurality of seismometers to a signal input of a respective one of said plurality of gating means; a summing amplifier having a plurality of inputs; means for connecting the output of each of said plurality of gating means to a respective input of said summing amplifier; means for applying each of said sequentially produced output signals from said counting means other than said predetermined one to a control input of a respective one of said gating means to cause the respective gating means to pass the seismometer output signal applied thereto to the respective input of said summing amplifier; an oscilloscope having a grid, an X deflection coil, a Y deflection coil and a screen; means for applying said first output from said counting means across said Y deflection coil; means for applying the output of said summing amplifier to said grid of said oscilloscope to vary the intensity of the electron beam of said oscilloscope and thus the brightness of the corresponding spot on said screen responsive to the respective seismometer output signal being applied to the input of said summing amplifier; means responsive to an output of said means for actuating for producing a direct current bias sweep current; means for applying said direct current bias sweep current to said X deflection coil; and a camera positioned with respect to said oscilloscope to photograph said screen.

2. Apparatus for producing a visual variable density record of a plurality of signals comprising a source of a plurality of signals; a timing pulse generator; means for actuating said timing pulse generator and said source; counting means having a first output comprising a stairstep voltage with the voltage level being advanced one unit for each pulse applied to the input of the counting means, and a second output comprising a plurality of sequentially produced output signals, each of said sequentially produced output signals being representative of a respective predetermined number of pulses applied to the input of the counting means; means responsive to a predetermined one of said sequentially produced output signals for resetting said counting means; a plurality of gating means corresponding in number with said plurality of signals, each of said gating means having a signal input and a control input; means for applying each of said plurality of signals from said source to a signal input of a respective one of said plurality of gating means; a summing amplifier having a plurality of inputs; means for connecting the output of each of said plurality of gating means to a respective input of said summing amplifier; means for applying each of said sequentially produced output signals from said counting means other than said predetermined one to a control input of a respective one of said gating means to cause the respective gating means to pass the one of said plurality of signals applied thereto to the respective input of said summing amplifier; an oscilloscope having a grid, an X deflection means, a Y deflection means and a screen; means for applying said first output signal from said counting means across said Y deflection means; means for applying the output of said summing amplifier to said grid of said oscilloscope to vary the intensity of the electron beam of said oscilloscope and thus the brightness of the corresponding spot on said screen responsive to the respective one of said plurality of signals being applied to the input of said summing amplifier; means responsive to an output of said means for actuating for producing a direct current bias sweep current; means for applying said direct current bias sweep current to said X deflection means; and a camera positioned with respect to said oscilloscope to photograph said screen.

3. Apparatus for producing a visual variable density record of a plurality of signals comprising a source of a plurality of signals; a timing pulse generator; means for actuating said timing pulse generator and said source; counting means having a first output comprising a stair-step voltage with the voltage level being advanced one unit for each pulse applied to the input of the counting means, and a second output comprising a plurality of sequentially produced output signals, each of said sequentially produced output signals being representative of a respective predetermined number of pulses applied to the input of the counting means; means responsive to a predetermined one of said sequentially produced output signals for resetting said counting means; a plurality of gating means corresponding in number with said plurality of signals, each of said gating means having a signal input and a control input; means for applying each of said plurality of signals from said source to a signal input of a respective one of said plurality of gating means; an oscilloscope having a grid, an X deflection means, a Y deflection means and a screen; means for connecting the output of each of said plurality of gating means to said grid; means for applying a respective one of said sequentially produced output signals from said counting means to a control input of a respective one of said gating means to cause the respective gating means to pass the one of said plurality of signals applied thereto to said grid to vary the intensity of the electron beam of said oscilloscope and thus the brightness of the corresponding spot on said screen responsive to said one of said plurality of signals; means for applying said first output signal from said counting means across said Y deflection means; means responsive to an output of said means for actuating for producing a direct current bias sweep current; means for applying said direct current bias sweep current to said X deflection means; and a camera positioned with respect to said oscilloscope to photograph said screen.

4. A method of producing a visual variable density record of a plurality of seismic signals comprising imparting vibrations to the medium under investigation at a first location; detecting reflected vibrations at a plurality of second locations spaced from said first location and producing a plurality of seismic signals, each being representative of the reflected vibrations detected at a respective one of said plurality of second locations; establishing a plurality of timing pulses; establishing a voltage which increases in amplitude in a stair step fashion responsive to the occurrence of one of said timing pulses; applying said voltage to the Y deflection input of an oscilloscope; sequentially sampling each of said plurality of seismic signals and applying the sampled values thus obtained to the grid of said oscilloscope, each sampling being responsive to the occurrence of a respective predetermined number of said plurality of timing pulses; applying a sweep signal to the X input of said oscilloscope; and photographically recording the image on the screen of said oscilloscope; the frequency of the occurrence of the timing pulses being sufficiently high that the highest frequency of interest in the seismic signals will be sampled several times during each cycle thereof.

References Cited by the Examiner
UNITED STATES PATENTS

| | | | |
|---|---|---|---|
| 2,858,475 | 10/1958 | Blake | 340—15.5 |
| 2,877,080 | 3/1959 | Eisler et al. | |
| 2,949,973 | 8/1960 | Broding et al. | 181—.5 |
| 3,025,123 | 3/1962 | Klein | 346—110 X |
| 3,173,743 | 3/1965 | Weissensteiner | 340—15.5 X |
| 3,193,838 | 7/1965 | Mitchell | 346—110 |

BENJAMIN A. BORCHELT, *Primary Examiner.*

R. M. SKOLNIK, *Assistant Examiner.*